United States Patent [19]
Sackinger et al.

[11] Patent Number: 5,141,715
[45] Date of Patent: Aug. 25, 1992

[54] ELECTRICAL DEVICE FOR CONVERSION OF MOLECULAR WEIGHTS USING DYNODES

[75] Inventors: William M. Sackinger, College, Ak.; Brian L. Morgan, Croyden; Robert W. Airey, London, both of England

[73] Assignee: University of Alaska, Fairbanks, Ak.

[21] Appl. No.: 682,386

[22] Filed: Apr. 9, 1991

[51] Int. Cl.⁵ .......................... B01J 19/08; B01J 19/12
[52] U.S. Cl. .............................. 422/186.04; 422/186
[58] Field of Search .............. 422/186, 186.01, 186.03, 422/186.4, 186.07, 186.18, 186.21, 186.29; 204/172

[56] References Cited

U.S. PATENT DOCUMENTS

| | | | |
|---|---|---|---|
| 1,983,028 | 12/1934 | Henry | 422/186.01 |
| 3,260,876 | 7/1966 | Manley et al. | 422/186.18 |
| 3,677,931 | 7/1972 | O'Hare | 422/186.04 |
| 3,942,020 | 3/1976 | Ciambrone | 250/539 |
| 5,019,355 | 5/1991 | Sackinger | 422/186.04 |

OTHER PUBLICATIONS

Illes P. Csorba, "Image Tubes", Howard W. Sams & Co., Inc. 1985, Incl. Title Page, Contexts & pp. 36–41, 236–247 and 252–255.

D. Washington et al., "Technology of Channel Plate Manufacture", Acta Electronica. vol. 14, No. 2, 1971, pp. 201–224.

Primary Examiner—Brooks H. Hunt
Assistant Examiner—Daniel J. Jenkins
Attorney, Agent, or Firm—Finnegan, Henderson, Farabow, Garrett & Dunner

[57] ABSTRACT

An electrical device is provided for the conversion of molecules of one molecular weight into molecules of another molecular weight. A reaction chamber comprises an array of dynodes, each of which possesses a plurality of apertures. External voltages are available which are applied between dynodes, producing an electric field. During operation, electrons and ions strike the interior surfaces of the dynode apertures, ionizing neutral molecules absorbed on the surfaces, which are desorbed by the energy of the impact, and which are accelerated by the electric field to a new dynode surface location, where they combine with absorbed molecules there to form a variety of new, larger molecules, or different, smaller molecules. Certain ones of the ions created are repetitively moved to one end of the device, where they may be pumped away separately. The controlled electron and ion impact ionization in the device can also produce reactions among several molecular species which would be unlikely or impossible under normal chemical equilibrium conditions, or with normal catalysts.

18 Claims, 3 Drawing Sheets

ELECTRICAL DEVICE FOR CONVERSION OF MOLECULAR WEIGHTS USING DYNODES

BACKGROUND OF THE INVENTION

1. Field of the Invention

The present invention relates to the conversion of the size of molecules in a process stream, using an electrical method, and can be used either to combine small molecules into larger molecules or to separate larger molecules into smaller molecules.

2. Discussion of the Related Art

Electrical conversion of molecules of one molecular weight into molecules of another molecular weight has been described in the patent application published as PCT/US88/03228 in WO 89/02868 (Sackinger), corresponding to U.S. patent application Ser. No. 07/485,856, filed Feb. 22, 1990, which is a continuation application of Ser. No. 07/102,361, filed Sep. 28, 1987. In that application, an array of tubular elements with a semiconducting layer beneath their interior surfaces is used as a converter. Electron and ion impact upon the interior surfaces of the tubes is used to fragment neutral molecules absorbed there. Energy for electron and ion impact is provided by an electric field, produced by the voltage applied from one side of the array to the opposite side of the array. Ion impact, fragmentation and ion emission take place on the interior surfaces of the tubes and also ion recombination into new gas species takes place. It can be said that the device operates using electron and ion impact, an electric field, and a very large interior surface area. This can have applications in the petrochemical process industries.

In the petroleum process industries, for many decades a thermal separation process has been applied to crude oil, which is a mixture of hydrocarbons, to separate out various fractions which are subsequently used for specific purposes. For example, diesel fuel, gasoline, naptha, lubricating oils, and asphalts are separated by vaporization and subsequent condensation at appropriate different temperatures and heights in a tower. The resulting yields of refined products are dependent upon the characteristics of the crude oil supplied, which will be different for each petroleum reservoir. The market demand for each category of refined products is variable in time, and therefore the adjustment of the petroleum refining process to changes in input composition and output demand can be difficult and challenging.

One remedy which has been recognized for many years is to convert larger molecules into smaller ones, a process called cracking, which has been normally accomplished by catalytic action on special surfaces at high temperatures. In this way, for example, an extra quantity of heavy oils can be converted into gasoline, which may be more marketable. Moreover, light naptha, which is a mixture of pentanes and hexanes, may be catalytically cracked to produce ethylene, $C_2H_4$, a building block molecule for many petrochemicals. Limitations of this approach include the cost of catalysts, the range of input molecules for which they are effective, and the thermal energy required for the process, which is difficult to recover. In addition, the world supply of liquid hydrocarbons is also being consumed, leading to higher prices for liquid feedstocks. Obvious alternatives include the utilization of other natural sources of hydrocarbons which are in more abundant supply: natural gas, and heavy oil. It is clear that an important advantage would be derived from methods to convert natural gas (methane in particular) into higher hydrocarbons such as ethylene, propylene, and larger molecules. Most processes rely on the high-temperature combination of methane and steam to produce hydrogen and carbon monoxide. For example, a Davy-McKee reformer furnace in New Zealand operates at 880° C. and 30 bar pressure with a nickel catalyst. After cooling to 35° C. at 17 barg pressure, and removal of excess steam, the reformed gas is compressed to 100 barg and passed over a $ZnO/CuO/Al_2O_3$ catalyst at 210°-240° C. The output product is crude methanol containing 17% water. An alumina catalyst is then used (at 310°-320° C. and 26 barg pressure) to create dimethyl ether. Clearly, high operating temperatures, high pressures, and costly equipment are necessary. An approach which involves a single-stage direct conversion, and in which the energy which is to be supplied to a reaction is specifically used to accomplish the molecular conversion, with a minimum waste as heat, would represent an improvement.

The electrical method briefly described above offers significant improvements in that low pressures (such as 0.001 to 0.1 bar) and room temperatures are involved. The use of oxygen is not essential, and water need not be part of the reaction unless specified output products containing oxygen are desired.

A limitation on the electrical device, however, is that a lower throughput of molecules is inherent at lower pressures, so that an equipment designer will naturally attempt to choose the operation pressure of the electrical device to be as high as possible, consistent with a specific conversion reaction. Each impact of ion and electron on the tubular reaction surfaces will result in a portion of the impact energy being converted into thermal energy in the material beneath the surface. A large value of pressure implies more ion impacts and more conversion reactions per second, and more heat (random thermal energy) generated in the material. The semiconducting material on the inside surfaces of the tubular elements may, in certain cases, have a negative temperature coefficient of resistance, so that high pressure operation would lead to heating, lower resistance, and higher leakage currents through the semiconductor layers. This may lead to self-heating and thermal runaway of the semiconductor layer, followed by destruction of electrical continuity through the layer. Proper choice of materials can prevent this effect, but it is the object of this invention to provide an alternative array of electrodes so that the semiconducting layer is not needed. Thus, higher pressure and higher throughput operation is facilitated.

It is also possible that in the aforementioned electrical device, operating at high pressures, that the high density of ions in the high-pressure ends of the tubular elements could give rise to an electric field distribution which would depend upon space charge density, which in turn could lead to plasma instabilities and the onset of acr discharge phenomena. In an ideal device, the intensity of the electric field strength would be controlled by external means, and would be time-variable and spatially-variable according to an adaptive and progressively more optimal pattern of applied external voltages. With the tubular elements and their semiconductor layer, this is difficult to accomplish inasmuch as only one voltage is imposed across the ends of the tubes. With this invention hereinafter described, this limitation is removed.

Although the foregoing discussion of molecular conversion is oriented towards hydrocarbon gaseous conversion, it is obvious that compound gases containing other elements, such as oxygen, chlorine, flourine, bromine, nitrogen, sulfur, hydrogen, silicon, and other elements could be changed in composition in order to accomplish certain benefits, such as the diminution of toxicity prior to release into the natural environment, or the alteration of composition so as to render harmful gases into harmless liquids or gases prior to release into the environment. Accordingly, it is an object of this invention to provide an electrical device which will accomplish the function of combining molecules of low molecular weight into molecules of higher molecular weight. A further object of the invention is to provide an electrical device for separating molecules of higher molecular weight into other molecules of lower molecular weight. Moreover, an additional object of the invention is to provide an electrical device for combining two or more different molecular species into new molecular species.

SUMMARY OF THE INVENTION

Briefly the present invention comprises an array of dynodes, made of metal, or of glass or ceramic with metal coatings. The term "dynode" is intended to mean any type of electrode which, upon being struck at by a single electron, yields several electrons. By applying a voltage between one dynode and an adjacent dynode, an electric field is established between dynode surfaces. A source of electrons is located at or just outside of the negatively-connected side of the dynode array, and these electrons are accelerated towards the first dynode, striking its surface with energies which may range from several electron volts to more than a hundred electron volts. For electron flow, gas pressures of less than 1 Torr are usually used, although operation at pressures several orders of magnitude higher is possible if volume electron/ion interaction effects are to be used for a supplemental improvement in operation. A gas which is to be converted is admitted into the chamber on the side of the dynode array which is opposite the electron source. Diffusion of the source gas into the dynode array takes place, with absorption of the gas molecules on the surfaces of the dynodes. Upon impact of the electrons upon the surfaces of the dynodes, several processes take place, the most obvious of which is the disruption of molecular bonding of the absorbed gas. In the case of methane source gas, a hydrogen ion is created, $H^{30}$, which immediately is separated from its parent molecule by the action of the electric field. Hydrogen ions thus created are accelerated away from the dynode upon which they were created, moving towards the adjacent, more negative dynode. Upon impact at the adjacent dynode, the hydrogen ion disrupts the bonding of the methane molecules there, and serves as an additional electron source via ion-induced secondary electron emission. The impact of electrons also creates secondary electron emission, with a net gain in electron flux along the dynode array. Furthermore, once methane molecules are stripped of one or more hydrogen atoms, and have been released from the dynode surface by the energy associated with electron or ion impact, they are accelerated towards the positive end of the dynode array. In such a state of ionization, they will bond readily to other similar species, and to neutrals, upon collision with them, and the formation of carbon-carbon bonds is probable. By the repeated application of this process in a methane source gas, formation of higher-order mixtures of paraffins, aromatics, olefins, and polyenes takes place. A physical separation of the available hydrogen from the newly-formed higher-order hydrocarbon products is made possible by the electric field. Charge exchange is possible because of the flow of electrons through space, and the flow of electrical current through the metallic surfaces of the dynodes. Energy for the dissociation is provided by the electric fields between dynodes, which accelerates electrons, hydrogen ions, and complex hydrocarbon ions. Energy transfer is by direct impact at the surfaces of the dynodes. Volume interaction effects also take place at higher pressures, with similar results. Both chemiabsorbed molecules and physically absorbed molecules at the dynode surfaces are affected and transformed by the electron impact process. The higher-order molecules are electrically moved to the region of higher inlet gas pressure, where they are carried by the inlet gas pressure gradient laterally to an outlet stream. A condensation stage then removes the higher-order species and the residual methane may be recirculated through the device. The same device, if operated in a high electron flux mode, could decompose high-order hydrocarbon molecules deposited on the surfaces of the dynodes and a separate collecting electrode held at a slightly positive voltage would attract such fragments. In this mode, lower molecular weight species could be produced from large molecules. It is clear that the admission of gaseous mixtures into this apparatus would result in a variety of output compounds, with a very large number of possibilities which could be considered. It is also clear that the hydrogen ions emerging from the region of the most negative dynode could be either pumped away or could be used to fragment large-molecular-weight hydrocarbon molecules via either a surface interaction or a volume interaction.

DESCRIPTION OF THE PREFERRED EMBODIMENTS

Figure 1:
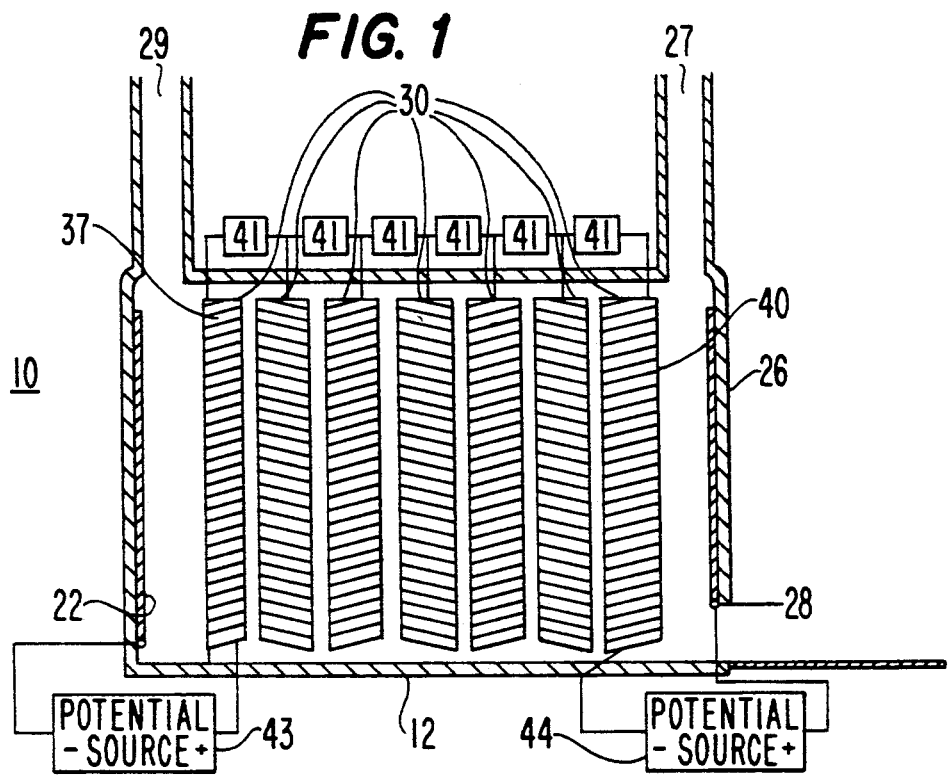
FIG. 1 is a section view of a simplified reaction chamber of a first embodiment of the present invention.
Figure 2:
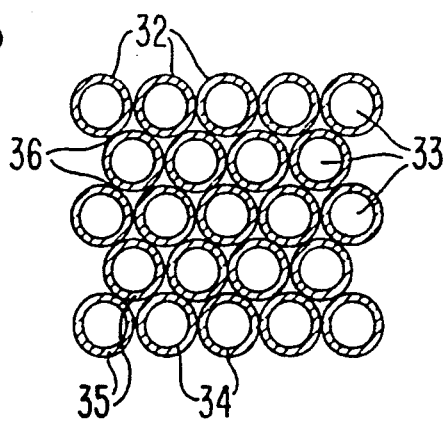
FIG. 2 is an end section view of part of the parallel array of tubes comprising one dynode of the first embodiment.

Referring now to the drawings and, in particular, to FIG. 1, there is shown an electrical device 10 for conversion of hydrocarbon molecular weights using dynodes, comprising a chamber 12 with walls constructed of glass, ceramic, or metal, with an inlet gas source 27, an outlet gas port 28, and a hydrogen outlet gas port 29. Disposed upon or near the inside wall of chamber 12 is an electrode 26 constructed of metal, and on the opposite side of chamber 12 is another electrode 22 constructed of metal or a suitable semiconducting material, which can serve as an electron source. Within the central part of chamber 12 is mounted a plurality of tubular dynode elements 30. Each dynode element comprises metallic tubes 33 which are joined together along their outer boundaries in an array so that the axes of the tubes 33 are co-parallel. The tubular elements 32 comprise metal, such as nickel or tantalum, and are bound together by brazing at their boundaries 36, as shown in FIG. 2. The interior of the tubes 32 are open cylinders 34 with interior surfaces 35 which have secondary-electron-emitting properties. High secondary electron emission yields may be obtained, for example, from layers of a silver-magnesium alloy or a copper-beryllium alloy. There is an angle between the tubes' axes 33 and the face 40 of the dynode array which is at least as large as the arc cosine of d/l, where d is the individual tube diameter and l is the individual tube length.

Each dynode 30 is separated from the adjacent dynodes by a suitable spacing, and each dynode is separately connected electrically to a metallic connection which penetrates the insulating part of the enclosure. For each pair of dynodes 30 a potential source 41 is required. Each pair of adjacent dynodes 30 has a separate potential source 41 connected between them. Also, source 44 is connected from the final dynode 30 to electrode 26, and source 43 is connected from electrode 22 to first dynode 30. Connection of these sources through a glass or ceramic chamber 12 is shown, whereas if a metallic chamber wall is used, separate insulative feed-through connections through the chamber wall would be required.

Briefly describing the operation of the device in the mode which increases hydrocarbon molecular weights, the input gas such as methane $CH_4$ is admitted through port 27 into the chamber 10, with an ambient pressure of $10^{-6}$ to 1 Torr, for example. Diffusion of the gas into tubes 32 of each dynode occurs, with some of the gas absorbing on the interior walls 35. Electrons originating either from the electron source 22, or from field emission from the metallic coating on face 22, or from cosmic rays, photoemission, or other natural sources, are accelerated along the length of the region from source 22 to first dynode 30, striking the interior walls 35 with substantial energies such as 10 to 100 electron volts. The range of energy values is adjustable with potential source 43. A sequence of cascading impacts takes place, which will be described below in detail, which removes hydrogen ions from the absorbed molecules, and allows hydrogen ions to move in the open cylinders 34 towards source 22, while at the same time allows negatively-charged hydrocarbon ions to move in the open cylinders 34 towards the next adjacent dynode 30. Subsequent impact of these hydrocarbon ions with other similar charged or neutral species on adjacent dynode 30 causes combination into larger hydrocarbon molecules, which emerge from the face 40 of final dynode 30 and are pumped away into outlet 28. Concurrently, the extracted hydrogen ions are carried by the electric field due to potential source 43 towards source 22 where they combine with others of the same species and are pumped away into outlet 29. A partition 37 of the chamber 10 prevents mixing of hydrogen with hydrocarbons. Some of the inlet methane will pass, by diffusion, directly into outlet port 28 and will be separated in subsequent condensation stages from the heavier hydrocarbon molecules formed by the device operation, after which the methane may be recirculated back into the inlet stream which feeds port 27.

Figure 3:
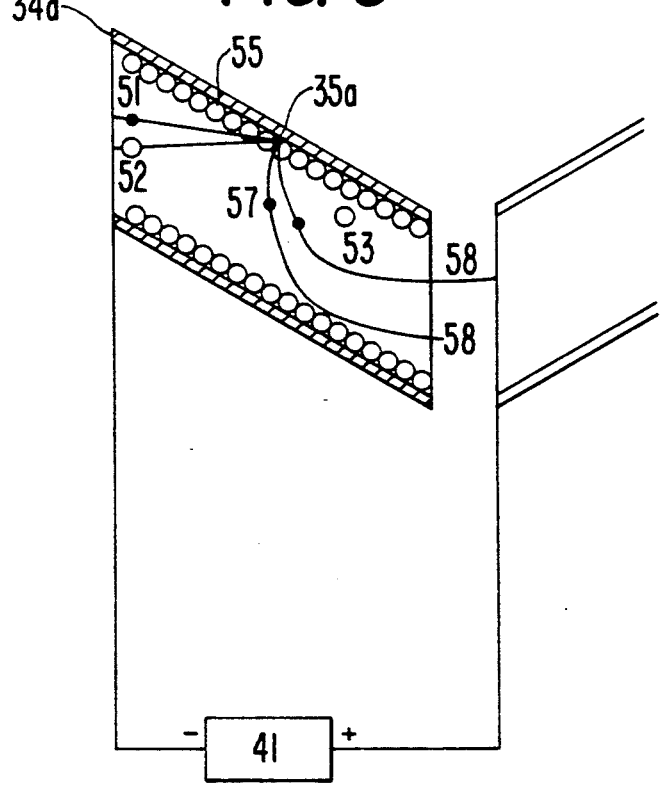
FIG. 3 is a section view of one such tube with an angle between dynode face and tube axis of the first embodiment.

To further elaborate upon the details of the separation and recombination mechanism, with reference to FIG. 3, the methane molecules 55 may be considered to be absorbed upon the interior walls 34 in a strong, chemi-sorbed bond, which pertains to a surface monolayer, and also in a weaker, multi-molecular-layer bond for additional molecules. When interior surfaces 35 are struck by an incident electron 51 with energy in the range 10 to 100 electron volts, a variety of processes are initiated. Some of the incident electron 51 energy goes to create secondary electrons 57 which are emitted from the wall 35 and which are accelerated in complex trajectories 58 to perpetuate the process at the next impact on the next dynode 30 with wall 35a. In order to extract the secondary electrons thus created in dynode 30, the distorted electric field associated with the presence of the open aperture at the end of the tubes 33 must extend nearly to the region of secondary electron creation, which in turn is within about one to two diameters of the electron-input side of the dynode 32. Thus, the length l of the tubular elements 33 will be only 2 to perhaps 5 times the diameter d of a tubular ion 52 from an absorbed gas molecule 55, also creating a negatively-charged hydrocarbon ion 53, for example $CH_3$ or $CH_2$. Some of the incident electron 51 energy imparts sufficient kinetic energy to these ions 52 and 53 so that they depart from their surface creation site and are accelerated along the electric field direction, in complex curved paths. The hydrogen ion 52 will subsequently strike an adjacent dynode tube wall 35 with sufficient energy to create secondary electrons which will contribute to the electron cascade required for the process; this is a positive ion feedback effect. The same impact of hydrogen ion 52 on wall 35 will also provide sufficient energy to disrupt the bonding of one or several gas molecules 55 absorbed at that site, thus creating more positive hydrogen ions and negative hydrocarbon ions which are released from that site and which are accelerated in opposite directions, thus contributing to the process. The hydrocarbon ion 53, acquiring kinetic energy along its path, strikes an adjacent dynode tube wall 35 with energy sufficient to disrupt bonds of molecules 55 at the site of impact, permitting the formation of a carbon-carbon bond at that site, and thus the creation of a higher weight hydrocarbon molecule. At the site of formation of the carbon-carbon bond, other processes such as secondary electron production, and hydrogen ion production also may be expected to take place. In some cases, the higher-weight hydrocarbon may not leave the wall 35 immediately upon creation but will be dislodged by a subsequent electron or ion impact. The net trend of these processes may be summarized by noting that (a) electron and ion kinetic energy is applied to the surface zone where the hydrocarbon molecules are absorbed; (b) rupture of at least one of the hydrocarbon bonds leads to a species separation by means of the electric field; (c) the arrival of an energetic hydrocarbon ion at the surface zone further disrupts absorbed molecules and causes them to form carbon-carbon bonds; and (d) higher weight molecules are moved, as ions, in a direction opposite that of the excess hydrogen, to the end of the device where they are pumped out.

Replenishment of methane molecules 55 on the surface will take place rapidly by diffusion and deposition from the gas phase present in the tube. Some degree of interaction between charged particles and neutral molecules in the volume space of the tube will also take place, with charge-separation and species separation trends as described for the walls 35, further enhancing the process.

The proper amount of charge required for electron current conservation at each impact site is provided by the metal dynodes 32.

The paths of the electrons and of the ions, as described above, have a length which depends upon the dynode-to-dynode electric field strength, upon the initial kinetic energy of the particles, and their direction of emission from the surface. Inasmuch as the impact-creation of these charged particles involves the combination of many random processes within the wall 35, the direction and initial kinetic energy of the particles will follow a statistical distribution function. The alternate orientation of the axes of the tubes in adjacent dynodes is chosen so that ion impact is assured on each dynode, and therefore electrons and ions are not passing through a dynode cylinder without impacting the interior surface 35 of a tubular element 32.

Figure 4:
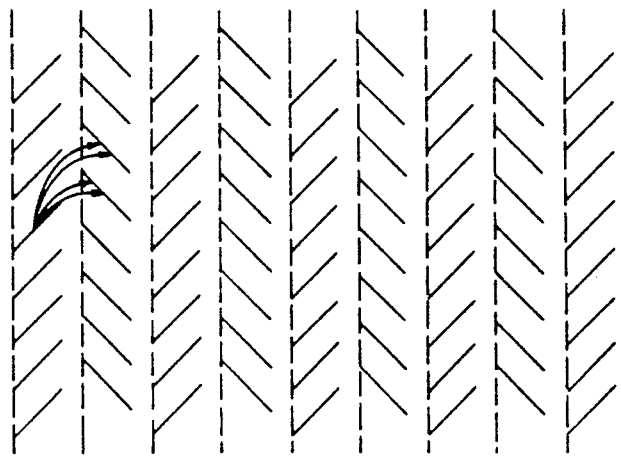
FIG. 4 illustrates examples of nine dynodes of a third embodiment of the present invention.
Figure 5:
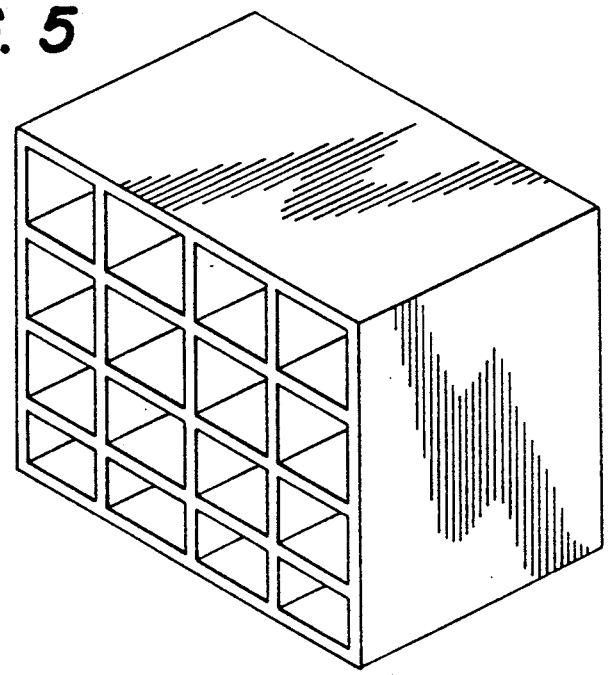
FIG. 5 illustrates an example of a dynode of a fourth embodiment of the present invention.
Figure 6:
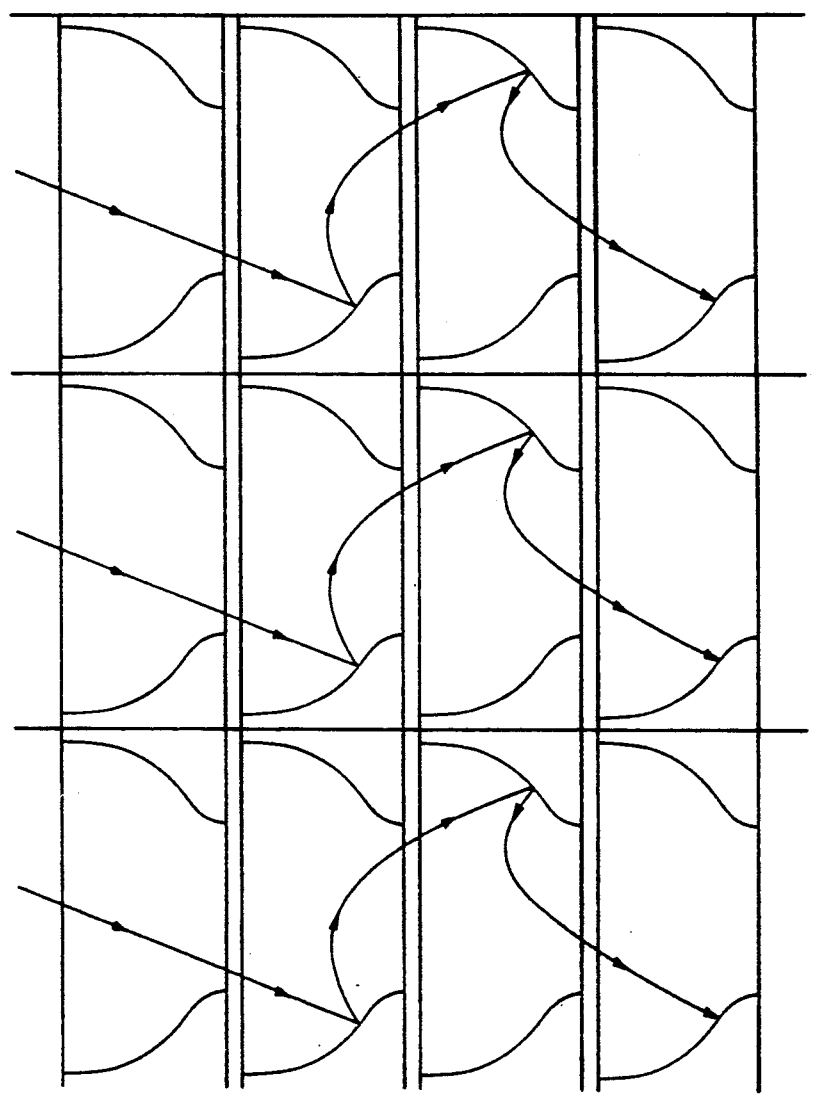
FIG. 6 illustrates examples of four dynodes of a fifth embodiment of the present invention.

Other dynode shapes are possible. For example as shown in FIG. 4, a dynode may be constructed of an array of flat strips of metal, with the faces co-parallel and inclined at an angle, resembling the well-known "Venetian-blind." Each such "Venetian-blind" dynode would have the main length direction of the strips oriented orthogonal to the length direction in the adjacent dynodes. Other possible dynode shapes include, for example, an array of intersecting strips which form squares (FIG. 5), or plates with an array of conical holes drilled or punched into their surface (FIG. 6).

Inasmuch as the present invention is subject to many variations, modifications, and changes in detail, it is intended that all subject matter discussed above or shown in the accompanying drawings be interpreted as illustrative and not in a limiting sense. Such modifications and variations are included within the scope of this invention as defined by the following claims.

We claim:

1. An apparatus for converting a first substance having a first molecular weight into a second substance having a second molecular weight, the apparatus comprising:
   a first dynode having a first end and a second end, said first dynode including an electrically-conductive material, or either glass or ceramic with an electrically-conductive coating;
   a second dynode having a first end and second end, the first end of said second dynode being separated from the second end of said first dynode, said second dynode including an electrically-conductive material, or either glass or ceramic with an electrically-conductive coating;
   means for supplying the first substance to said first and second dynodes; and
   means, connected to said first and second dynodes, for establishing a first potential throughout the electrically-conductive material or electrically-conductive coating of said first dynode and a second potential, different from said first potential, throughout the electrically-conductive material or electrically-conductive coating of said second dynode to establish an electric field across the separation between the second end of said first dynode and the first end of said second dynode and to convert the first substance into the second substance.

2. The apparatus of claim 1, wherein each of said first and second dynodes comprises at least one tubular element.

3. The apparatus of claim 2, wherein said tubular elements have a length and a diameter, said length being 2-5 times larger than said diameter.

4. The apparatus of claim 2, wherein each of said tubular elements has a central axis, and wherein said first and second dynodes are arranged such that their respective central axes are at different orientations.

5. The apparatus of claim 2, wherein said electric field extends into at least a portion of each of said tubular elements.

6. The apparatus of claim 1, wherein each of said first and second dynodes comprises flat strips arranged mutually co-parallel in both a main length direction and in a width direction.

7. The apparatus of claim 1, wherein each of said first and second dynodes comprises flat strips arranged to form at least one tubular element having a polygonal cross-section.

8. The apparatus of claim 1, wherein each of said first and second dynodes comprises a plate having at least one conical opening formed therethrough.

9. The apparatus of claim 1, further comprising:
   a third dynode having a first end and a second end, the first end of said third dynode being separated from the second end of said second dynode, said third dynode including an electrically-conductive material, or either glass or ceramic with an electrically-conductive coating;
   a fourth dynode having a first end and a second end, the first end of said fourth dynode being separated from the second end of said third dynode, said fourth dynode including an electrically-conductive material, or either glass or ceramic with an electrically-conductive coating;
   means, connected to said second and third dynodes, for establishing a third potential, different from said second potential, throughout the electrically-conductive material or electrically-conductive coating of said third dynode to establish an electric field across the separation between the second end of said second dynode and the first end of said third dynode and convert the first substance into the second substance; and
   means, connected to said third and fourth dynodes, for establishing a fourth potential, different from said third potential, throughout the electrically-conductive material or electrically-conductive coating of said fourth dynode to establish an electric field across the separation between the second end of said third dynode and the first end of said fourth dynode and to convert the first substance into the second substance.

10. The apparatus of claim 9, wherein each of said first, second, third and fourth dynodes comprises a tubular element, each of said tubular elements having a central axis, and wherein said tubular elements are arranged such that their respective axes have selected orientations.

11. The apparatus of claim 9, wherein each of said first and fourth dynodes comprises flat strips arranged mutually coparallel in both a main length direction and a width direction.

12. The apparatus of claim 9, wherein each of said first, second, third and fourth dynodes comprises flat strips arranged to form at least one tubular element having a polygonal cross-section.

13. The apparatus of claim 9, wherein each of said first, second, third and fourth dynodes comprises a plate having at least one conical opening formed therethrough.

14. The apparatus of claim 1, wherein said means for establishing an electric field includes means for time-varying and/or spatially-varying said electric field.

15. An apparatus for converting a first substance having a first molecular weight into a second substance having a second molecular weight, the apparatus comprising:

a first array, said first array including a plurality of dynodes each having a first end and a second end, said dynodes of said first array including an electrically-conductive material, or either glass or ceramic with an electrically-conductive coating;

a second array, said second array including a plurality of dynodes each having a first end and a second end, the first ends of said dynodes of said second array being separated from the second ends of said dynodes of said first array, said dynodes of said second array including an electrically-conductive material, or either glass or ceramic with an electrically-conductive coating;

means for supplying the first substance to said first and second arrays; and means, connected to said first and second arrays, for establishing a first potential throughout the electrically-conductive materials or electrically-conductive coatings of said plurality of dynodes of said first array and a second potential, different from said first potential, throughout the electrically-conductive materials or electrically-conductive coatings of said plurality of dynodes of said second array to establish an electric field across the separation between the second ends of said dynodes of said first array and the first ends of said dynodes of said second array and to convert the first substance into the second substance.

16. The apparatus of claim 15, further comprising:

a third array, said third array including a plurality of dynodes each having a first end and a second end, the first ends of said dynodes of said third array being separated from the second ends of said dynodes of said second array, said dynodes of said third array including an electrically-conductive material, or either glass or ceramic with an electrically-conductive coating;

a fourth array, said fourth array including a plurality of dynodes each having a first end and a second end, the first ends of said dynodes of said fourth array being separated from the second ends of said dynodes of said third array, said dynodes of said fourth array including an electrically-conductive material, or either glass or ceramic with an electrically-conductive coating;

means, connected to said second and third arrays, for establishing a third potential, different from said second potential, throughout the electrically-conductive materials or electrically-conductive coatings of said plurality of dynodes of said third array to establish an electric field across the separation between the second ends of said dynodes of said second array and the first ends of said dynodes of said third array and to convert the first substance into the second substance; and means, connected to said third and fourth arrays, for establishing a fourth potential, different from said third potential, throughout the electrically-conductive materials or electrically-conductive coatings of said plurality of dynodes of said fourth array to establish an electric field across the separation between the second ends of said dynodes of said third array and the first ends of said dynodes of said fourth array and to convert the first substance into the second substance.

17. In an apparatus including a first dynode having a first end and a second end and a second dynode having a first end and a second end, the first end of the second dynode being separated from the second end of the first dynode, and each of the first and second dynodes including an electrically-conductive material, or either glass or ceramic with an electrically-conductive coating, a method, performed by the apparatus, for converting a first substance having a first molecular weight into a second substance having a second molecular weight, the method comprising the steps of:

supplying the first substance to the first and second dynodes; and establishing a first potential throughout the electrically-conductive material or electrically-conductive coating of said first dynode and a second potential, different from said first potential, throughout the electrically-conductive material or electrically-conductive coating of said second dynode to establish an electrical field across the separation between the second end of the first dynode and the first end of the second dynode and to convert the first substance into the second substance.

18. In an apparatus including a first array having a plurality of dynodes each having a first end and a second end, and a second array including a plurality of dynodes each having a first end and a second end, the first ends of the plurality of dynodes of the second array being separated from the second ends of the plurality of dynodes of the first array, and the plurality of dynodes of the first and second arrays including an electrically-conductive material, or either glass or ceramic with an electrically-conductive coating, a method, performed by the apparatus, for converting a first substance having a first molecular weight into a second substance having a second molecular weight, the method comprising the steps of:

supplying the first substance to the first and second arrays; and establishing a first potential throughout the electrically-conductive materials or electrically-conductive coatings of said plurality of dynodes of said first array and a second potential, different from said first potential, throughout the electrically-conductive materials or electrically-conductive coatings of said plurality of dynodes of said second array to establish an electric field across the separation between the second ends of the plurality of dynodes of the first array and the first ends of the plurality of dynodes of the second array and to convert the first substance into the second substance.

* * * * *